United States Patent [19]

Bingham

[11] Patent Number: 4,617,473
[45] Date of Patent: Oct. 14, 1986

[54] CMOS BACKUP POWER SWITCHING CIRCUIT

[75] Inventor: David Bingham, San Jose, Calif.

[73] Assignee: Intersil, Inc., Cupertino, Calif.

[21] Appl. No.: 567,577

[22] Filed: Jan. 3, 1984

[51] Int. Cl.⁴ .............................................. H02J 9/06
[52] U.S. Cl. .................................... 307/66; 307/362; 365/229
[58] Field of Search .................... 307/64, 66, 584, 87, 307/44, 80, 46, 81, 48, 362; 365/229; 323/244, 283, 284, 299

[56] References Cited

U.S. PATENT DOCUMENTS

| | | | |
|---|---|---|---|
| 4,288,865 | 9/1981 | Graham | 307/64 X |
| 4,384,350 | 5/1983 | Lee et al. | 365/229 |
| 4,451,742 | 5/1984 | Aswell | 307/66 |
| 4,463,270 | 7/1984 | Gordon | 365/229 X |
| 4,484,084 | 11/1984 | Cheffer | 307/64 |
| 4,492,876 | 1/1985 | Colbert et al. | 307/66 |
| 4,498,040 | 2/1985 | Tatsushi et al. | 323/299 |

Primary Examiner—A. D. Pellinen
Assistant Examiner—Derek S. Jennings
Attorney, Agent, or Firm—Spensley, Horn, Jubas & Lubitz

[57] ABSTRACT

A load circuit is provided with a backup power supply to power the essential functions of the load in the event that its primary power supply fails or is otherwise degraded. The positive terminals of both the primary power supply and the backup power supply, having a common negative reference, are input to a differential voltage comparator circuit. The output of the differential voltage comparator circuit controls a switching transistor located in a line between the primary power supply and the load, and when inverted by an inverter circuit, controls a second switching transistor located in a line between the backup power supply and the load. In operation, only the more positive of the primary power or the backup power supply voltages is provided to the load. The output of the inverter circuit is also available to indicate which of the two sources the power is applied to the load, and may be further used to disable non-essential portions of the load circuitry.

5 Claims, 3 Drawing Figures

CMOS BACKUP POWER SWITCHING CIRCUIT

BACKGROUND OF THE INVENTION

1. Field of the Invention

The present invention relates to power supply switching circuits, and in particular to a device for automatically providing backup power to a load as a function of detected voltage levels.

2. Description of the Prior Art

A power supply is intended to provide power to a load. It can fail to provide adequate power for a number of reasons. For example, it may be intentionally or inadvertently turned off, or it may experience a short circuit or an open circuit such that its output power goes to zero, or the line connecting the power supply to the load may open. Similarly, a component failure within the power supply may cause the available power to be degraded below that level of power necessary to operate the load. In the event of such a failure, operation of the load is generally interrupted until the power is restored. However, a variety of loads can be envisioned which require uninterrupted power. Examples of such loads include clocks performing essential time keeping functions, volatile memories containing unique or critical data, and life support systems.

Backup power switching circuits are designed to switch the load to an auxiliary power supply in the event of failure of the primary power supply. Such circuits are interposed between the load and the primary power supply and optionally include the auxiliary power supply as part of the circuit. The auxiliary power supply, whether internal or external to the backup power switching circuit, is generally a lowpower battery having a limited ampere-hour useful life.

Previous backup power switching circuits have often employed discrete components which can consume significant power in their operation. The auxiliary power supply will thus be more rapidly drained and its useful life shortened. Additionally, the back-up circuit often tends to reduce the voltage provided to the load by the auxiliary power supply, which may further degrade operation of the essential features of the load.

SUMMARY OF THE INVENTION

It is a primary object of the present invention to provide a new and improved backup power switching circuit which avoids the disadvantages associated with prior art circuits of this type.

It is an additional object of the present invention to provide a new and improved backup power switching circuit which switches an external load to the one of two or more input power supplies providing a greater magnitude of electrical potential than is exhibited by either of the remaining available input power supplies.

It is another object of the present invention to provide a new and improved backup power switching circuit which can be fabricated as a single monolithic integrated circuit chip and is capable of being incorporated within a load microcircuit.

A further object of the present invention is to provide a new and improved integrated backup power switching circuit of reduced cost and relatively compact size.

It is still another object of the present invention to provide a new and improved backup power switching circuit which can be fabricated utilizing conventional CMOS technologies.

It is a further object of the invention to provide a new and improved backup power switching circuit which consumes reduced power and provides reduced voltage losses.

The herein invention provides an integrated backup power switching circuit wherein, as inputs to the circuit, power from a primary supply and power from an auxiliary supply are independently coupled, through controllable power switches, to an output of the circuit supplying a load. In parallel, power from each of the circuit inputs for the primary and auxiliary supplies are input to a differential comparator, each through a separate high impedance, low current input. In view of the high impedance, low current nature of these inputs, the differential comparator operates to compare the relative magnitude of electrical potential applied to each of the inputs without significant reduction from current drop effects through the comparator. The differential comparator then provides an output electrical potential which assumes different levels dependent upon which one of the primary and auxiliary supplies is dominant. The output electrical potential of the differential comparator is applied to control elements of the power switches to turn on that switch which allows power from the dominant supply to be conducted to the circuit output and to the load.

In another aspect of the present invention, two MOS transistors are incorporated to act as low loss (low impedance) power switches to selectively couple power from the primary supply and the auxiliary supply to the circuit output. The conducting conditions of the switching transistors are controlled by the output from the differential comparator. In the illustrated embodiment, each MOS power switching transistor is configured so that a parasitic diode formed in each transistor enhances the current flow from either the primary or the auxiliary power source to the load. Additionally, MOS transistors generally exhibit a very high impedance at their control inputs, thus providing very low current drain through such inputs and thus, through the differential comparator.

In addition to the above-identified advantages, the present invention readily allows integration of the circuit either as a stand alone module or as an integral part of an integrated circuit load.

These and other objects of the invention, together with the features and advantages thereof, will become apparent from the following detailed specification, when read together with the accompanying drawings, in which applicable reference numerals have been carried forward.

DETAILED DESCRIPTION OF THE INVENTION

Figure 1:
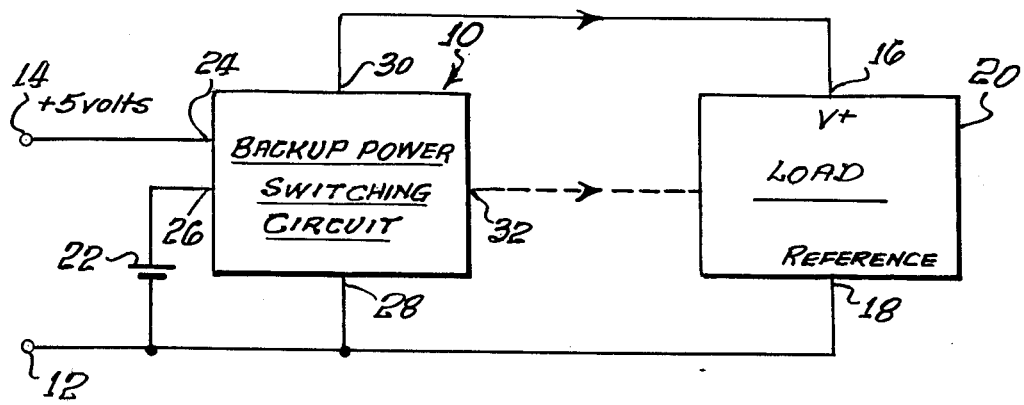
FIG. 1 is a block diagram illustrating a typical application of a backup power switching circuit in accordance with the present invention.

Referring now to FIG. 1, a preferred embodiment of a backup power switching circuit in accordance with the present invention is indicated generally at 10. Primary power is provided by an external supply, not illustrated, and is applied across a pair of terminals 12 and 14 of the backup circuit 10. Terminal 12 is, for purposes of illustration, arbitrarily selected to be a reference potential and will be considered to be 0 volts, D.C. Also for purposes of illustration, terminal 14 is at a positive DC voltage relative to the reference. Absent the backup power switching circuit 10, the primary supply would be applied directly to inputs 16 and 18 of a load 20.

Generally the inclusion of a battery 22 or other auxiliary power supply, to enable the load 20 to maintain necessary functions, requires that means be provided to switch the load to the auxiliary power when necessary. The circuit 10 (hereinafter referred to as "battery backup circuit 10") provides a low power, low voltage loss, integrated circuit serving that purpose. In the illustrated configuration, the positive primary supply voltage from terminal 14 is coupled to the battery backup circuit 10 through a first input 24. The positive terminal of the battery 22 is introduced into the battery backup circuit 10 through a second input 26. The negative terminal of the battery 22 and the primary power supply terminal 12 are coupled to the reference input 28 of the circuit 10. By introducing the reference potential appearing at terminal 12 to the battery backup circuit 10 through the reference input 28, the relative magnitudes of the potentials appearing at the first input 24 and the second input 26 are compared within the battery backup circuit 10 and switches are appropriately turned on and off to conduct the greater of the potentials appearing at inputs 24 and 26 through an output 30 to the load input 16. The battery backup circuit 10 also provides an indicator output 32 which exhibits a voltage dependent, in magnitude and polarity, upon which source provides the power at the output 30. If the load 20 has been so designed, the indicator output 32 may be utilized to shut down all but the essential operations of the load when power from the primary supply is absent or degraded.

Figure 2:
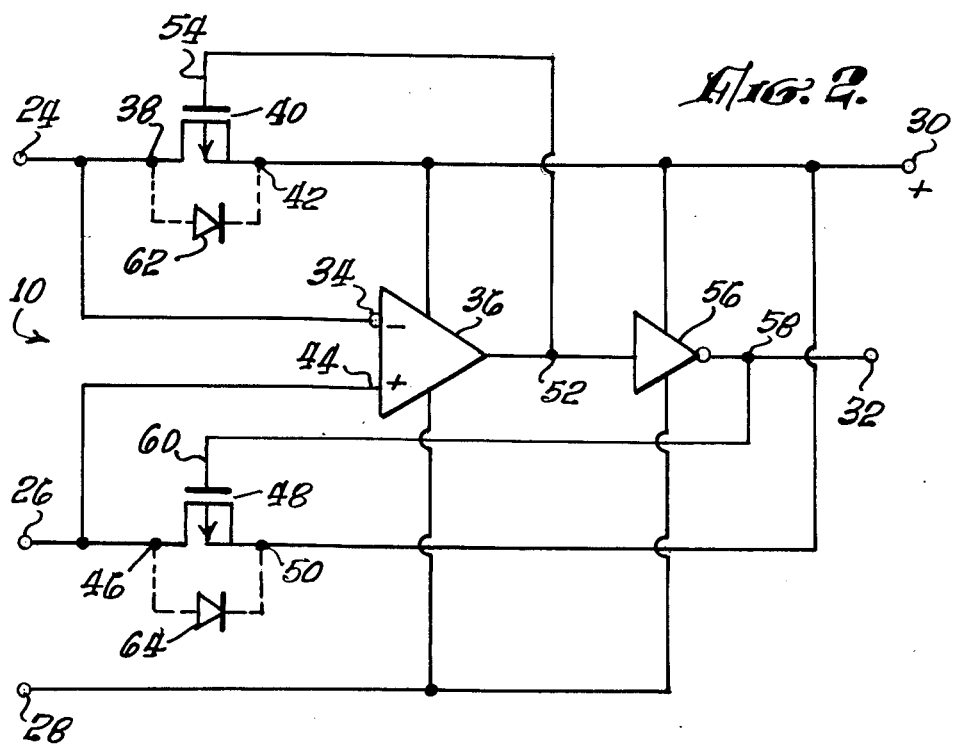
FIG. 2 illustrates a block schematic diagram of the backup power switching circuit of FIG. 1.

Referring now to the block schematic diagram presented in FIG. 2, the operation of the illustrated embodiment of the battery backup circuit 10 is further described. The first input 24 of the battery backup circuit 10, coupled externally to the positive DC voltage of the primary supply, is connected both to the inverting input 34 of a differential comparator 36 and to the input 38 of a first p-channel MOS transistor 40. The output 42 of transistor 40 is connected to the output 30.

The positive DC voltage from the backup battery is coupled to input 26 which is connected both to the non-inverting input 44 of the differential comparator 36 and to the input 46 of a second p-channel MOS transistor 48. The output 50 of transistor 48 is also connected to the output 30.

If the electrical potential appearing at the first input 24 is greater than the potential appearing at the second input 26, the output 52 of the differential comparator 36, coupled to the control input 54 of transistor 40, turns on the transistor 40, thereby allowing transistor 40 to conduct power from the primary power supply at the first input 24 to the output 30.

The output 52 of the differential comparator 36 is also coupled to an inverter 56. If the second input 26 has a greater potential than the first input 24, the output 52 of the differential comparator 36 turns off the transistor 40. In addition, the output 52 of the comparator 36, is inverted by the inverter 56. The output 58 of the inverter 56, coupled to the control input 60 of transistor 48, turns on the transistor 48, thereby enabling conduction of the auxiliary or backup battery power appearing at the second input 26 to the output 30. It is to be noted that when the primary supply is being conducted from input 24 through transistor 40 to the output 30, the output 58 of the inverter 56 turns off transistor 48. The output 58 of the inverter 56 also serves as the indicator output 32 and may be further coupled to an indicator or to the load to disable portions of the load operation, or both.

The switching transistors 40 and 48 have formed therein parasitic diodes 62 and 64, respectively, forming parallel conduction paths through the switching transistors. These parasitic diodes arise through the connection of their substrates to their outputs 42 and 50, respectively. The utility of the parasitic diodes 62 and 64 will be more fully explained later.

In order to achieve proper operation of the battery backup circuit 10, the differential comparator 36 and the inverter 56 are each electrically coupled to the potential appearing at the output 30 and to the reference potential appearing at input 28. This coupling provides appropriate biasing for the differential comparator 36 and the inverter 56.

Figure 3:
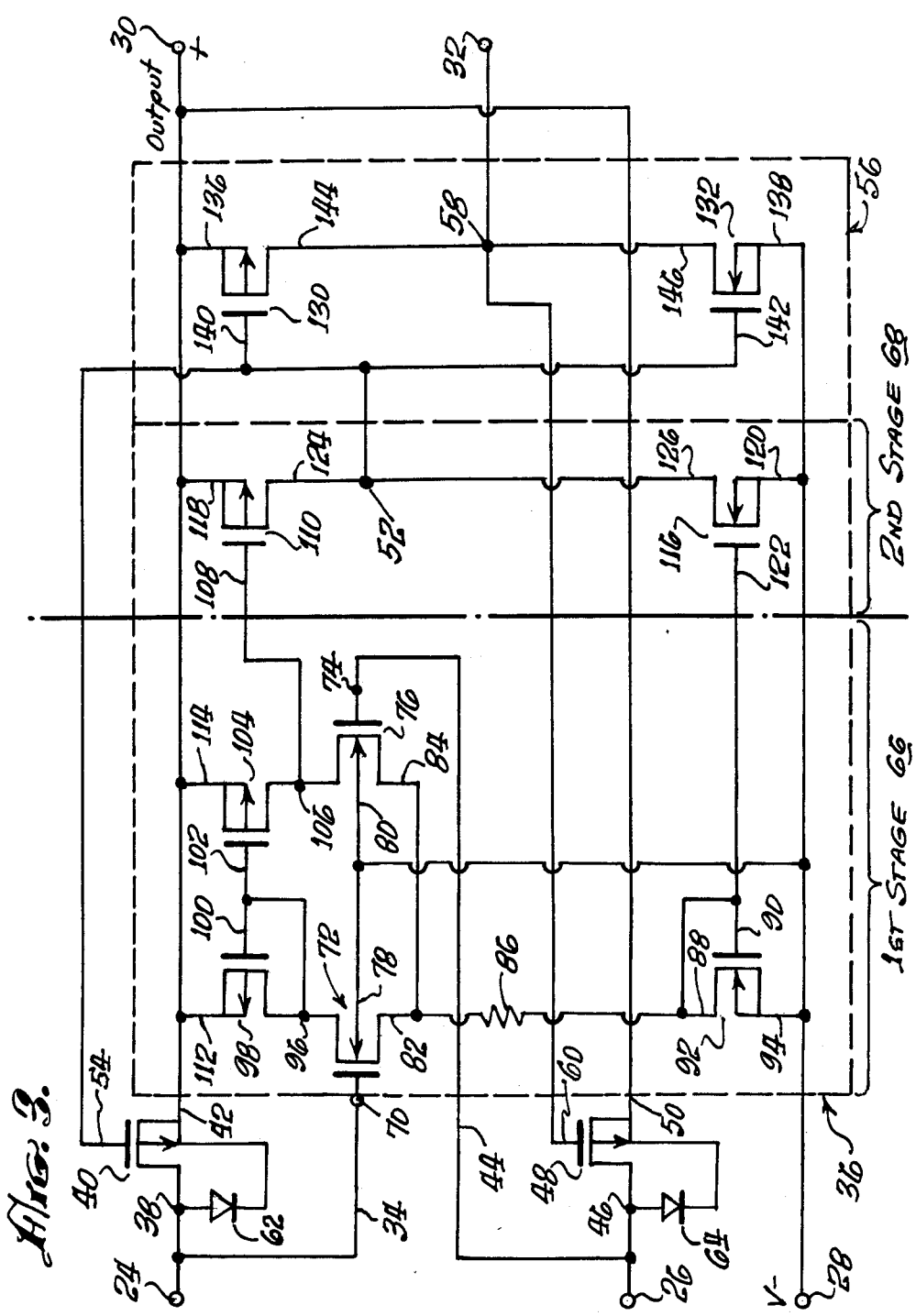
FIG. 3 provides a more detailed schematic diagram of the backup power switching circuit of FIG. 1.

Referring now to FIG. 3, a detailed schematic of the preferred embodiment of the herein invention is shown. A discussion of the overall operation of the circuit will be deferred until completion of the following detailed description of the circuit. Moreover, recognizing that both p-channel transistors and n-channel transistors conduct in either direction when appropriate electrical potentials are applied thereto, the conventional terms source, drain, and gate conventionally used to identify the primary regions of the several transistors appearing in FIG. 3 will not be utilized in this description. Rather, the terms "input", "output", and "control" will be used to refer to the appropriate terminals of each transistor, in accordance with conventional current flow through the circuit.

The differential comparator is shown generally at 36 and includes a first stage 66 and a second stage 68. The electrical potential from the primary power source coupled to input 24 of the battery backup circuit, in addition to being coupled to the input 38 of the first p-channel power transistor 40, is also coupled to an inverting input 34 of the first stage 66 of the differential comparator 36. The inverting input 34 of the differential comparator 36 is connected to the control input 70 of a first n-channel MOS transistor 72. The electrical potential from the auxiliary power source coupled to input 26 of the battery backup circuit, in addition to being coupled to the input 46 of the second p-channel power transistor 48, is also coupled to a non-inverting input 44 of the first stage 66 of the differential comparator 36. The noninverting input 44 is connected to the control input 74 of a second n-channel MOS transistor 76. Transistors 72 and 76 form an input n-channel MOS transistor differential pair, having their substrates 78 and 80, respectively, mutually coupled to the reference input 28.

The output 42 of transistor 40 is coupled to the input 112 of a third p-channel MOS transistor 98 and also to the input 114 of a fourth p-channel MOS transistor 104. The control inputs 100 and 102 of transistors 98 and 104, respectively, are mutually coupled to a node 96, which is in turn coupled both to the output of transistor 98 and to the input of the first n-channel MOS transistor 72.

The output of transistor 104 is coupled to a node 106, which is further coupled to the input of the second n-channel MOS transistor 76. The outputs 82 and 84 of transistors 72 and 76, respectively, are mutually coupled through a resistor 86 to the input 88 and to the control input 90 of a third n-channel MOS transistor 92. The output 94 of transistor 92 is coupled to the reference input 28.

The potential appearing at node 106 is coupled from the first stage 66 to the second stage 68 whereat it is connected to the control input 108 of a fifth p-channel MOS transistor 110. The input 118 of transistor 110 is coupled to the output 42 of the power transistor 40. The output 124 of transistor 110 is coupled to a node 52 (identical to the output 52 of the differential comparator 36) which is in turn coupled to the input 126 of a fourth n-channel MOS transistor 116, whose output 120 is coupled to the reference input 28. The control input 122 of transistor 116 is coupled to the control input 90 of transistor 92 located in the first stage 66.

The potential appearing at node 52 is further coupled to the control input 54 of the first p-channel power transistor 40 and to the control inputs 140 and 142 of a sixth p-channel MOS transistor 130 and a fifth n-channel MOS transistor 132, respectively. Transistors 130 and 132 comprise the inverter 56.

The input 136 of transistor 130 is coupled to the output 42 of the power transistor 40. The output 144 of transistor 130 is coupled to a node 58 (identical to the ouput of 58 of the inverter 56) which is in turn coupled to the input 146 of transistor 132. The output 138 of transistor 132 is coupled to the reference input 28.

The potential appearing at node 58 is further coupled to the indicator output 32 of the battery backup circuit, and also to the control input 60 of the second p-channel power transistor 48. The output 50 of transistor 48 is coupled to the output 30 of the battery backup circuit, which is also coupled to the output 42 of the first p-channel power transistor 42. Thus, the output 50 of transistor 48 is coupled to the inputs 112, 114, 118, and 136 of transistors 98, 104, 110, and 130, respectively.

The first stage 66 of the differential comparator 36 is comprised of the n-channel MOS differential pair, transistors 72 and 76, fed by a current mirror p-channel MOS transistor pair, transistors 98 and 104. A bias for the first stage 66 is provided by the resistor 86 and the transistor 92. The second stage 68, comprising transistors 110 and 116, provides additional voltage gain through the differential comparator 36. The transistors 92 amd 116 may be considered to be a second current source through the first stage 66 and the second stage 68, respectively.

The operation of the circuit will now be described. Under normal circumstances it is to be assumed that the auxiliary power source coupled to the input 26 has a lower positive DC voltage than the primary power source coupled to the input 24. Further, for purpose of illustration, an assumption is made that there is a short delay between the connection of the power sources to the backup battery circuit.

Prior to the connection of the first power source, which may be either the primary power source or the auxiliary power source, the output 30 of the battery backup circuit, together with the inputs 112, 114, 118, and 136, to transistors 98, 104, 110, and 130, respectively, will be substantially at the potential of the reference input 28, which implies that, since nodes 52 and 58 are also at substantially the potential of the reference input 28, both of the power transistors 40 and 48 are in a conducting condition.

When the first of either of the power sources is connected to its appropriate input, the p-channel power transistor to which the power source is connected will begin conducting and the output 30 will assume a potential approaching in magnitude the potential provided by the connected power source.

Suppose now that the other power source is connected to its appropriate input. As stated above, input 24 is presumed to have a higher potential than input 26. Referring to the differential pair comprising transistors 72 and 76, the control input 70 of transistor 72 is at a higher potential than the control input 74 of transistor 76. Under these conditions, transistor 72 will be enabled to conduct more current than will transistor 76. The current mirror pair of transistors 98 and 104 are controlled by the potential appearing at node 96 as presented to their control inputs 100 and 102, respectively. Since more current tends to flow through transistor 72, node 96 will tend to be at a potential nearer to that of the reference input 28 than will node 106. This causes transistors 98 and 104 to assume a substantially conducting state. The total current through both paths, the first comprising transistors 98 and 72 and the second comprising transistors 104 and 76, flows through the current limiting resistor 86 and through ·transistor 92. With transistor 104 being controlled to a conducting state and with transistor 76 controlled to a lower current conducting state, the potential appearing at node 106 will approach that of the output 30. Consequently, the p-channel MOS transistor 110, when presented with this high potential at its control input 108, will tend to be placed in a non-conducting state.

With transistor 110 assuming a relatively non-conducting state and with transistor 116 controlled to be as conducing as transistor 92, the potential appearing at node 52 will approach that of the reference input 28. This low potential, when presented to the control input 54 of the first p-channel power transistor 40, will cause transistor 40 to remain in its conducting state.

Transistors 130 and 132, forming the inverter 56, receive their control inputs 140 and 142, respectively, from the potential appearing at node 52. With that potential being low, the p-channel transistor 130 will tend to approach its full conducting state while the n-channel transistor 132 will tend to approach its non-conducting state, thereby causing the potential at node 58 to approach that appearing at the output 30. This high potential is then presented to the control input 60 of the second p-channel power transistor 48 causing it to assume its non-conducting state. The potential at the output 30 will now adjust to the potential applied to the input 24 since power transistor 40 is in a conducting state while power transistor 48 is a non-conducting state. Note that the parasitic diode 64 connected across the input 46 and output 50 of transistor 48 will not conduct since the output 50 of transistor 48, coupled to the output 30, is at a higher potential than the input 46 of transistor 48. Connecting a load to the output 30 of the battery backup circuit will therefore draw current only from the primary power source connected to input 24.

If during the condition described above, the primary power source fails or degrades so that its potential is less than that of the auxiliary power source, the potentials applied to the inputs 70 and 74 of the differential pair of transistors 72 and 76, respectively, will be changed so that transistor 76 will conduct the larger amount of current. Thus, node 96 will have a potential closer to that of the output 30, which will cause the p-channel transistors 98 and 104 to reduce their conduction capability, while the potential appearing at node 106 will approach that of the reference input 28. This provides a low potential to the control input 108 of the p-channel transistor 110, placing it into its conducting state. The reduced current flowing through the current limiting resistor 86 will tend to reduce the potential applied to the control inputs 90 and 122 of transistors 92 and 116, respectively, thereby reducing their conduction capability. This brings node 52 to a high potential which, when presented to the control input 54 of the first p-channel power transistor 40, causes it to assume its non-conducting state. Concurrently, the high potential at node 52, when presented to the control input 140 of the p-channel transistor 130, causes transistor 130, to approach its non-conducting state, while the same potential applied to the control input 142 of the n-channel transistor 132 places transistor 132 in a conducting state, thereby bringing the potential at node 58 to approach that of the reference input 28. This low potential is then coupled to the control input 60 of the second p-channel power transistor 48, placing transistor 48 into its conducting state. Consequently, current will then be passed to a load connected to the output 30 from the auxiliary power source connected to input 26, while the primary power source input 24 will be isolated.

The parasitic diodes 62 and 64 formed, as described earlier, across the inputs 38 and 46 and the outputs 42 and 50 of the p-channel power transistors 40 and 48, respectively, provide a current carrying enhancement to that power transistor which is placed in its conducting state by the above-described operational conditions. When the power transistor is conducting, its input and its output assume approximately the same potential. Any deviation therefrom would tend to place a higher potential at the input of the power transistor as a result of any voltage drop across such a transistor due to its inherent impedance. In such a case, the parasitic diode is not reversed biased and provides a parallel current path between input and output of the power transistor. Conversely, when the power transistor is not conducting, its output will be at a potential higher than that of its input because of the common coupling of both such outputs through the output 30. The parasetic diode will then be reversed biased and preclude conduction between outputs and inpt of the transistor.

The above-described backup battery circuit can be readily manufactured as a monolithic integrated circuit. Similarly, if it is desired, the battery backup circuit herein described may be incorporated as part of a larger integrated circuit constituting the load, wherein the indicator output 32 may be applied directly to the load.

While a preferred embodiment of the present invention has been disclosed herein, it will be clear that numerous modifications, variations, substitutions, changes, and partial equivalents will occur to persons skilled in the art without departing from the spirit and scope of the invention herein. Accordingly, it is intended that the invention be limited only by the spirit and scope of the appended claims.

I claim:

1. A backup power switching circuit comprising:
at least first, second, third, fourth, fifth, and sixth p-channel MOS transistors, each of said transistors including a control electrode, an output electrode, an input electrode; and a substrate;
at least first, second, third, fourth, and fifth n-channel MOS transistors, each of said transistors including a control electrode, an output electrode, an input electrode, and a substrate;
a high resistive impedance;
a reference terminal, adapted to provide a reference potential;
a first input terminal, coupled to the input electrode of said first p-channel MOS transistor, and to the control electrode of said first n-channel MOS transistor;
a second input terminal, coupled to the input electrode of said second p-channel MOS transistor, and to the control electrode of said second n-channel MOS transistor;
an output terminal, coupled to the output electrodes of said first and second p-channel MOS transistors;
means for applying a first direct current potential to said first input terminal;
means for applying a second direct current potential to said second input terminal, said second direct current potential having the same polarity relative to said reference terminal as said first direct current potential; and
coupling means for coupling said transistors and said terminals wherein:
(a) the control electrode of said first p-channel MOS transistor is coupled to the output electrode of said fifth p-channel MOS transistor and to the input electrode of said fourth n-channel MOS transistor, and the control electrode of said second p-channel MOS transistor is coupled to the output electrode of said sixth p-channel MOS transistor and to the input electrode of said fifth n-channel MOS transistor;
(b) said first and second n-channel MOS transistors have their substrates coupled together and to said reference terminal, providing a reverse bias with respect to their respective input electrodes, and their output electrodes are together coupled through said high resistive impedance to the input electrode of said third n-channel MOS transistor and to the control electrodes of said third and fourth n-channel MOS transistors;
(c) the output electrodes of said third and fourth n-channel MOS transistors are jointly coupled to said reference terminal and to the output electrode of said fifth n-channel MOS transistor;
(d) the input electrode of said first n-channel MOS transistor is coupled to the output electrode of said third p-channel MOS transistor and to the control electrodes of said third and fourth p-channel MOS transistors;
(e) the input electrode of second second n-channel MOS transistor is coupled to the output electrode of said fourth p-channel MOS transistor and to the control electrode of said fifth p-channel MOS transistor;
(f) the input electrodes of said third and fourth p-channel MOS transistors are coupled to the output electrode of said first p-channel MOS transistor, to said output terminal, and to the input electrodes of said fifth and sixth p-channel MOS transistors; and
(g) the output electrode of said fifth p-channel MOS transistor and the input of electrode of said fourth n-channel MOS transistor are further coupled to the control electrodes of said sixth p-channel MOS transistor and said fifth n-channel MOS transistor;
wherein, in dependence on the relative magnitudes of the direct current potentials applied to said first and second input terminals, said first or said second p-channel MOS transistor is driven into conduction to couple said input terminal having the greater magnitude to said output terminal.

2. A backup power switching circuit as in claim 1, wherein said output electrode of said sixth p-channel MOS transistor and said input electrode of said fifth n-channel MOS transistor are jointly further coupled to an indicator output terminal.

3. A backup power switching circuit as in claim 1 wherein said transistors, said high resistive impedance; and said coupling means comprise an integrated microcircuit.

4. A backup power switching circuit comprising:

first and second transistors, each of said transistors including a control electrode, an output electrode, an input electrode, and a substrate;

a reference terminal, adapted to provide a reference potential;

a differential voltage comparator including an inverting input, a non-inverting input, and an output coupled to the control input of said first transistor;

a voltage inverter having an input coupled to the output of the comparator, and an output coupled to the control input of the second transistor;

a first input terminal, coupled to the input electrode of said first transistor and to the inverting input of said comparator;

a second input terminal, coupled to the input electrode of said second transistor and to the non-inverting input of said comparator; and an output terminal coupled to the output electrodes of said first and second transistors;

wherein, in dependence on the relative magnitudes of the potentials applied to said first and second input terminals, said first or second transistor is driven into conduction to couple the input terminal having the greater magnitude to said output terminal.

5. A backup power switching circuit as in claim 4 wherein parasitic diodes are formed between said output electrodes and said substrates of said transistors, thereby providing alternate current paths of low impedance.

* * * * *